(12) United States Patent
Orzeck et al.

(10) Patent No.: US 8,726,439 B2
(45) Date of Patent: May 20, 2014

(54) MULTI TOOL STAND FOR DIGITAL DEVICE METHOD AND APPARATUS

(75) Inventors: Toren Orzeck, Portland, OR (US); Matthew Jellett, Bellingham, WA (US)

(73) Assignee: Geyser Ventures LLC, Portland, OR (US)

( * ) Notice: Subject to any disclaimer, the term of this patent is extended or adjusted under 35 U.S.C. 154(b) by 364 days.

(21) Appl. No.: 12/841,950

(22) Filed: Jul. 22, 2010

(65) Prior Publication Data

US 2011/0023238 A1 Feb. 3, 2011

Related U.S. Application Data

(60) Provisional application No. 61/230,493, filed on Jul. 31, 2009.

(51) Int. Cl.
*B26B 11/00* (2006.01)

(52) U.S. Cl.
USPC ................. 7/118; 7/128; 248/126; 248/163.1

(58) Field of Classification Search
USPC ...................... 7/118–125, 129, 132, 157, 170; 248/163.1, 165, 166, 170, 436, 440.1, 248/176.1, 188.6; 81/440; 396/419, 428
See application file for complete search history.

(56) References Cited

U.S. PATENT DOCUMENTS

| | | | |
|---|---|---|---|
| 856,610 A * | 6/1907 | Steindorf | 248/126 |
| 1,198,766 A * | 9/1916 | Ramsay | 248/126 |
| 2,016,744 A | 10/1935 | Heck | |
| 2,673,502 A | 3/1954 | Skodock | |
| 3,810,647 A | 5/1974 | Martchenke | |
| 4,027,318 A | 5/1977 | Knapp | |
| 4,079,908 A | 3/1978 | Davis | |
| 4,238,862 A | 12/1980 | Leatherman | |
| 4,297,756 A | 11/1981 | Lance | |
| 4,440,048 A | 4/1984 | Stevens et al. | |
| 4,476,596 A * | 10/1984 | Fortune | 7/138 |
| 4,545,660 A * | 10/1985 | Rudolf | 396/425 |
| 4,648,698 A | 3/1987 | Iwasaki | |
| 4,751,540 A | 6/1988 | Jones | |
| 5,027,141 A | 6/1991 | Bowers | |
| D350,970 S | 9/1994 | Usui | |
| 5,360,194 A | 11/1994 | Jacobson | |
| 5,390,885 A | 2/1995 | Shen | |
| 5,573,329 A | 11/1996 | van Gennep | |
| 5,669,592 A | 9/1997 | Kearful | |
| 6,007,259 A | 12/1999 | Mori et al. | |
| 6,623,182 B2 | 9/2003 | Tatera | |
| 7,146,667 B2 | 12/2006 | Elsener | |
| 7,290,740 B2 | 11/2007 | Joy et al. | |
| 7,373,681 B2 | 5/2008 | Elsener | |

(Continued)

FOREIGN PATENT DOCUMENTS

CN 2750360 1/2006
DE 202004020341 8/2005

*Primary Examiner* — Alicia Torres
(74) *Attorney, Agent, or Firm* — Matthew Jellett

(57) ABSTRACT

A multi tool with a handle arranged along a longitudinally aligned axis. The handle has a first end and a second end and a housing for containing a first tool. The multi tool also has a prop which interoperates with the first handle and provides stability against overturning of the multi tool when supporting a device. The multi tool also has a mount which is interoperable with either the handle or the prop. The mount will maintain a device in an upright position.

16 Claims, 15 Drawing Sheets

(56) References Cited

U.S. PATENT DOCUMENTS

| | | |
|---|---|---|
| 7,390,130 B2 | 6/2008 | Soulvie |
| 7,490,429 B2 | 2/2009 | Moody et al. |
| 2001/0012455 A1 | 8/2001 | Mulcahy et al. |
| 2005/0096645 A1 | 5/2005 | Wellman et al. |
| 2005/0096646 A1 | 5/2005 | Wellman et al. |
| 2005/0096670 A1 | 5/2005 | Wellman et al. |
| 2005/0096671 A1 | 5/2005 | Wellman et al. |
| 2005/0113642 A1 | 5/2005 | Wellman et al. |
| 2006/0087845 A1 | 4/2006 | Yeh |
| 2006/0173474 A1 | 8/2006 | Wellman et al. |
| 2007/0261174 A1 | 11/2007 | Barker |
| 2008/0224000 A1* | 9/2008 | Yang .................. 248/188.5 |
| 2008/0263945 A1 | 10/2008 | Moody et al. |
| 2008/0310834 A1 | 12/2008 | Chatman, II |
| 2009/0013837 A1 | 1/2009 | Hsieh |
| 2009/0090225 A1 | 4/2009 | Nenadic |
| 2009/0190917 A1 | 7/2009 | Chai |

\* cited by examiner

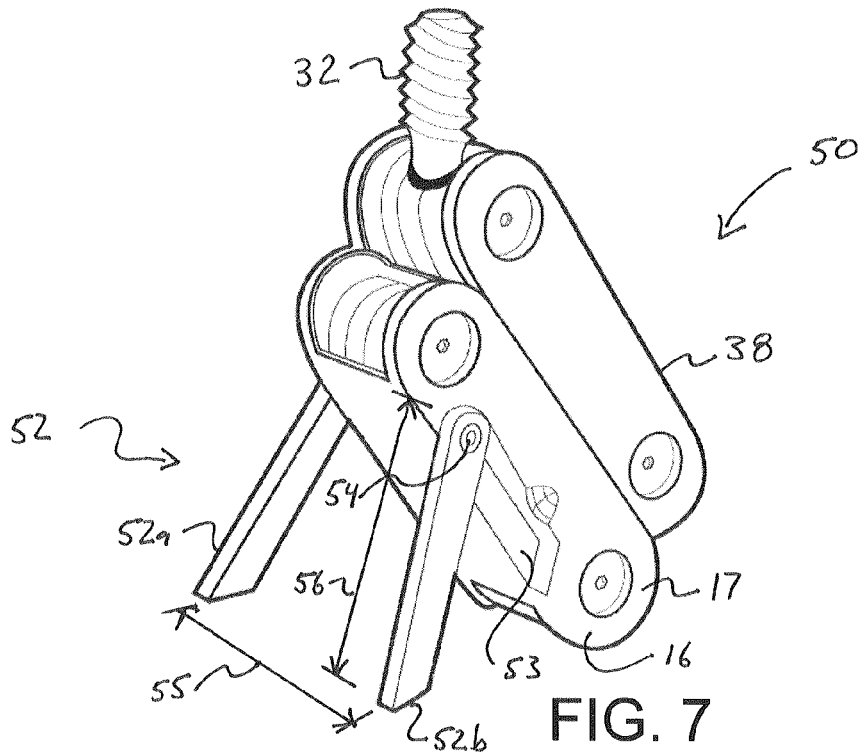
FIG. 7
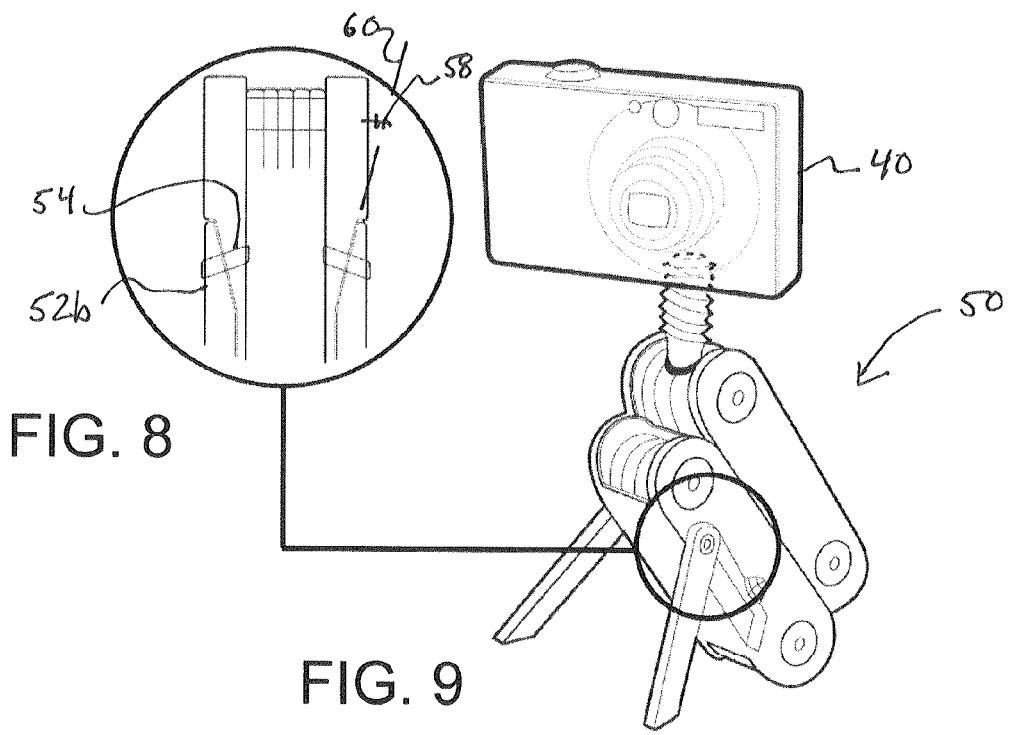
FIG. 8
FIG. 9

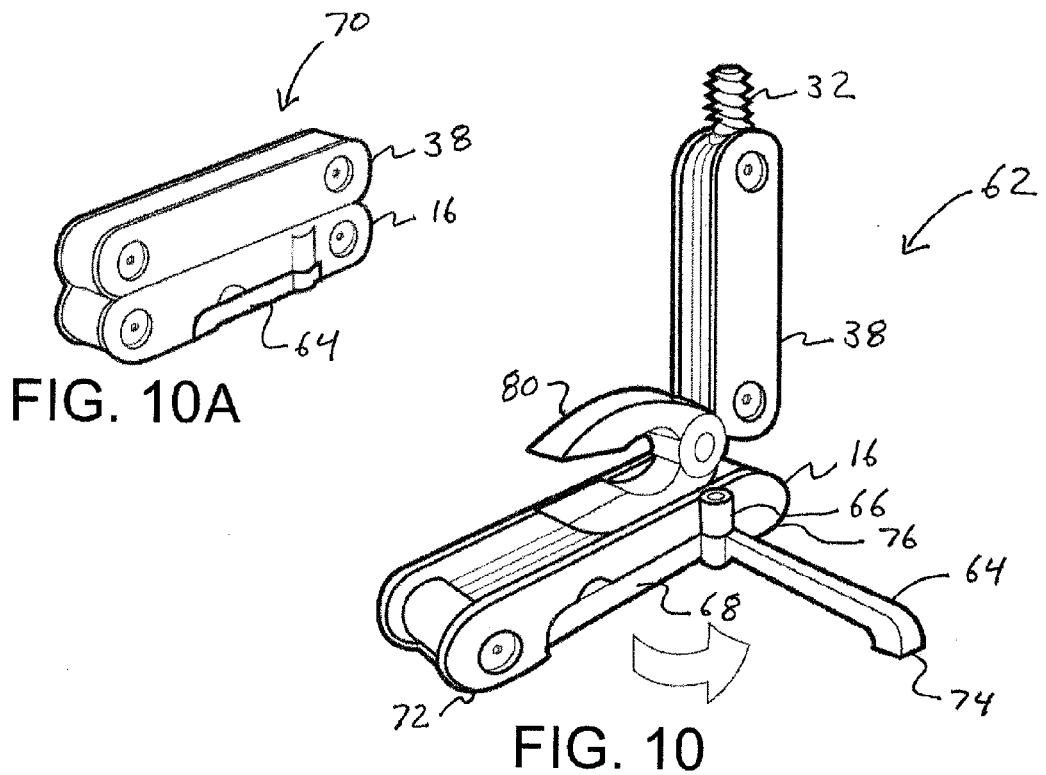
FIG. 10A
FIG. 10
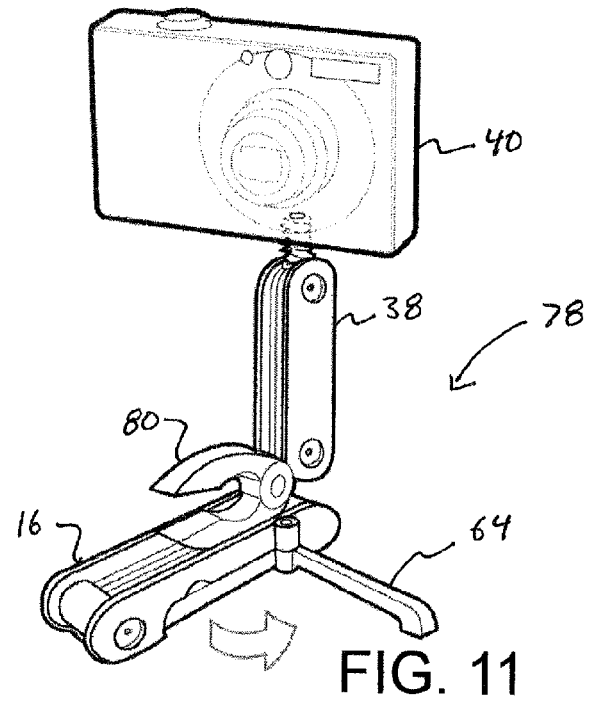
FIG. 11

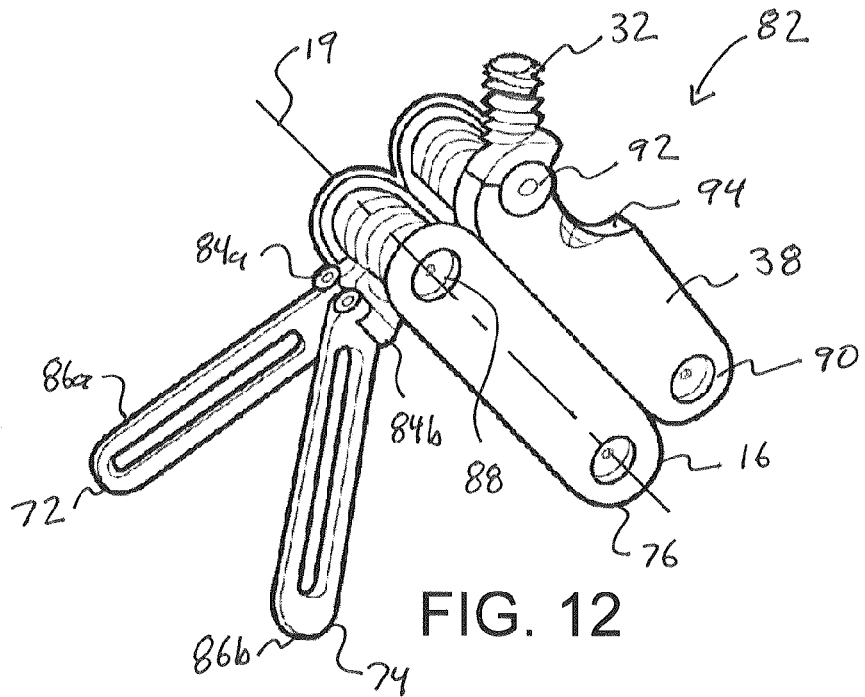
FIG. 12
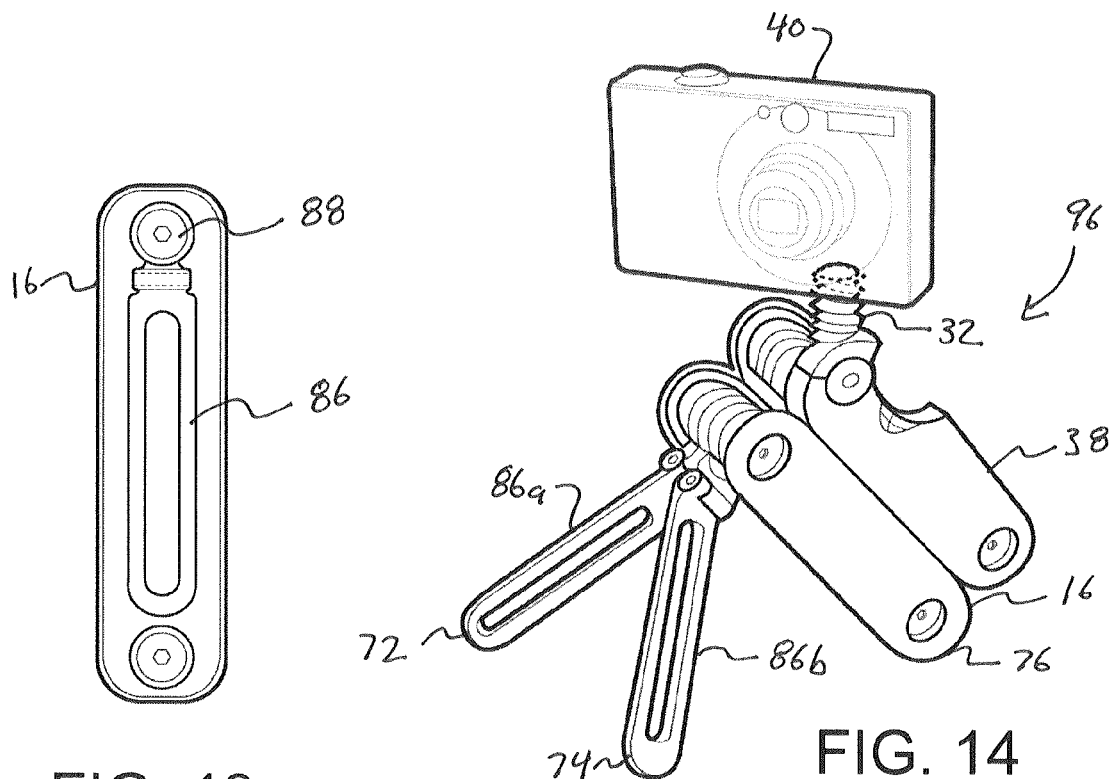
FIG. 13
FIG. 14

MULTI TOOL STAND FOR DIGITAL DEVICE METHOD AND APPARATUS

RELATED APPLICATIONS

This application claims priority benefit of U.S. Ser. No. 61/230,493 filed Jul. 31, 2009.

BACKGROUND

U.S. Pat. No. 5,390,885 discloses a locking mechanism for a portable tripod of a "Q-Pad" which has a casing assembly jointly assembled by a lower casing and an upper casing. At least three legs are rotatably attached to the casing assembly. The casing assembly further includes a retaining cut out. A supporting body defines a supporting surface for supporting a camera which is pivoted at the cutout of the casing assembly. The casing assembly further includes a locking mechanism wherein the supporting body can be held at a desired angle with respect to the casing assembly when the locking mechanism is held in a locked position.

U.S. Pat. No. 7,290,740 discloses a portable tripod and universal mounting assembly for an object to act as a stand for a device. The mounting assembly includes a body having a support surface, front face and an opposed mounting surface configured to mount to the support stand. The body further defines an elongated slot extending along and into the receiving socket from the support surface. The mounting assembly further includes a resilient retaining arm cantilever deposed in the receiving socket. The retaining arm includes a contact portion movable between a release position and a locked position . . . in column 3 around line 63 "the stand assembly includes a portable stand device and a universal mounting assembly for removably securing the camera phone or object to the portable stand device via a mounting button.

U.S. Pat. No. 7,480,429 discloses a vertical fore grip with bipod, which includes an ergonomic fore grip/gun handle with a concealable and collapsible bipod. One version can have a tubular recess consisting of a first cylindrical housing encompassing the bipod legs when concealed and a sliding piston that deploys the legs and a second cylindrical cutout housing a release mechanism and a void space for other accessories . . . the grip proportion has an outer surface with a flat surface on sides of the grip to provide a more stable grip, assist in orientating a mounted weapon and support pressure pads for lights.

US 2006/0087845 discloses a knife structure which has a main body and at least a foldable tool on one side thereof and a media player mounted on the other side, wherein the media player has a plurality of function keys, microphone, camera lens, a speaker, a storage device and an output/input device. The knife structure provides the knife tools and can be used as an entertaining object to listen to digital music, take photographs and film, or make audio recording.

U.S. Pat. No. 5,669,592 discloses a camera support for mounting a camera having a threaded opening and an external wall. The support has a shaft and a second end and a longitudinal axis there between. Coarse self tapping anchor threads are disposed on the first end of the shaft for threadingly engaging a support structure. Machine type support threads are disposed on the second end of the shaft for threadingly engaging the threaded opening of the camera. A handle extends transversely to the axis of the shaft for manually rotating anchor threads into the support structure.

U.S. Pat. No. 4,079,908 discloses a camera support apparatus where a camera is supported in a position by providing a support screw for engagement with the usual threaded opening of the camera base, in association with a sharply pointed member, such as a knife blade, which is inserted into earth, snow, ice, wood or other supporting material pierceable by the pointed member. The camera support member has the support screw on one end attached to the tang of the knife blade by a clevis allowing pivotable movement of the camera to a desired angular position relative to the supporting surface.

U.S. Pat. No. 5,573,329 discloses a light source holder for maintaining a flashlight or other instrument in a desired location. The holder has an interface unit which is secured to a gripping device such as a vice grip or pliers. A connector for the instrumentality also is provided as part of the combination [which] connector is attachable to the interface unit.

Add a vice grip connection for attaching onto rigid vertical locations. For example the multi-tool which has the stand component and the device holding component, in combination with vice grip pliers or other type of gripping mechanism.

U.S. Pat. No. 7,146,667 discloses a pocket tool, particularly a pocket knife or plate like tool card, which has a housing, at least one receiving area, and at least two functional components movable from a storage position within this receiving area into a working position outside of the receiving area. The first functional component is designed as a tool, particularly a pair of scissors or a knife. The second functional component has a support casing and is equipped with a recordable and readable non-volatile memory, as well as an interface. A releaseable locking device and a longitudinal guide are pivot bearing and are arranged around the support casing of the second functional component and the housing.

BRIEF DESCRIPTION OF THE DRAWINGS

FIG. 7 is perspective overall view of a multi-tool stand with mount;

FIG. 8 is a cross-sectional detail view of the pivot hinge axle;

FIG. 9 is a perspective overall view of the multi-tool stand with mount and device;

FIG. 10 is a perspective overall view of the multi-tool swing leg with mount;

FIG. 10A is a perspective overall view of the same in a closed position;

FIG. 11 is a perspective overall view of the same with device;

FIG. 12 is a perspective overall view of a multi-tool with spring-loaded radially aligned V-legs and mount;

FIG. 13 is a cross-sectional elevational view of the same;

FIG. 14 is a perspective overall view of the same with device;

DESCRIPTION OF THE PREFERRED EMBODIMENTS

The present concept will now be described fully herein with reference to the accompanying drawings, in which some, but not all, embodiments of the concepts are shown. Indeed the multiple embodiments may be utilized in many different forms and should not be construed as limited to just the embodiments as set forth herein; rather, these multiple embodiments are provided so that this disclosure will satisfy applicable legal requirements. Like numbers refer to like elements throughout the disclosure.

A multi-tool with prop and mount is provided as shown in the following embodiments. The multi-tool may be incorporated with multiple types of tools where the multi-tool can include pliers, wire cutters, wire strippers, knife blades, bit drivers, screwdrivers, saw blades, bottle openers, can openers, saws, files, razors, gut hooks, scissors, et cetera.

The multi-tool with prop and mount may be provided with just the prop or just the mount. If just the mount is provided, to provide stability, the multi tool can be fixed to a surface utilizing a knife tool from the multi tool, or a clamping mechanism from the multi tool to secure onto a stable object. For example, the mount may be provided as an object or tool component in the multi tool handle casing and positioned to be secured to the device. The prop component used may be the spring-loaded pliers of which the two multi tool handles form a portion of the pliers. Or the prop component may be the knife which biases out of one of the multi tool handles and which can then be staked into a ground engaging location. A description of each of the tools separate and in combination with one another will be provided herein. The first discussion of the multi-tool with prop 10 as seen in FIG. 1 will be provided as an initial discussion.

Figure 1:
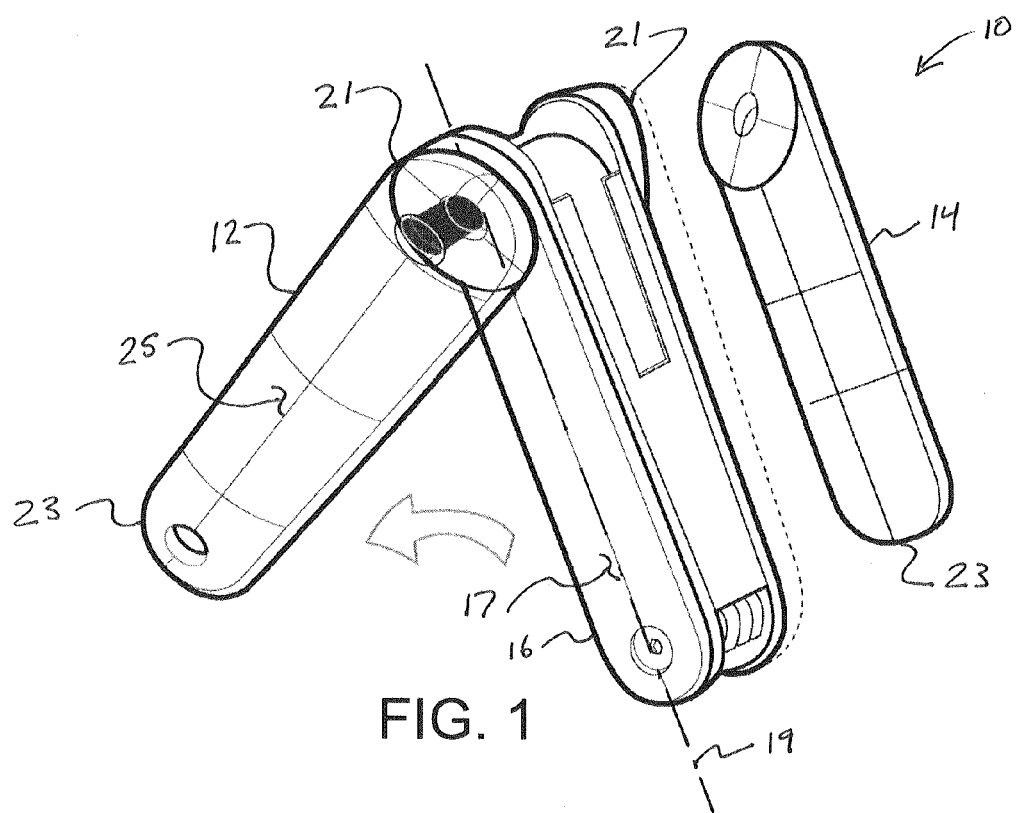
FIG. 1 is a perspective overall view of a multi-tool with prop.
Figure 2:
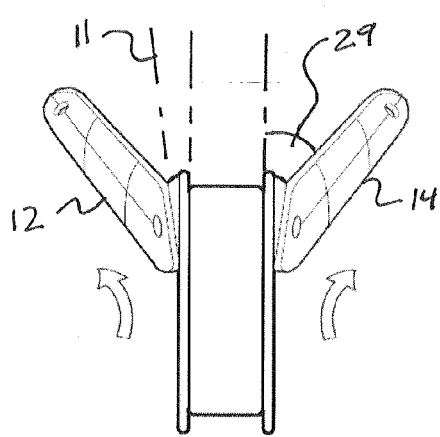
FIG. 2 is a top plan view of the same.
Figure 3:
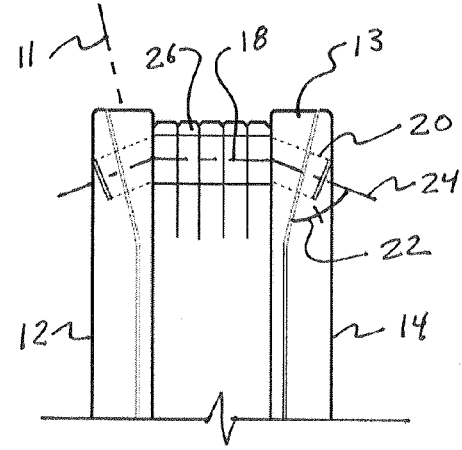
FIG. 3 is a detailed cross-sectional view of the prop axle.

Referring to FIGS. 1, 2 and 3, the multi-tool with prop 10 includes in this particular embodiment a first handle 16 which has a first biasing prop leg 12 and a second biasing prop leg 14 attached on the outer longitudinal faces of the first handle 16. The first and second biasing prop legs 12 and 14 each are connected at a pivot end 21 and are formed as a semi-rectilinear outer shell 25 of the first handle 16. Each of the prop legs has a stand end 23 which is arranged to pivot away from the face of the first handle 16 at a biasing angle 24 as seen in FIG. 3, to provide a three-legged stand the purposes of which will be discussed below.

The first and second biasing prop legs are each connected at the pivot end 21 to the first handle 16 by means of an axle 26 running through the pivot end of the first handle 16 with the axle 26 angled through a pivot surface 13 which provides a pivot plane 11 about which the first and second biasing prop legs 12 and 14 pivot to the standing position. The angled axle 20 extends through the pivot surface 13 and acts as the connection point for the biasing first and second prop legs 12 and 14. The angled axle 20 is arranged at a longitudinal axle angle 22 which provides for the angular prop stand distance 29.

Figure 4:
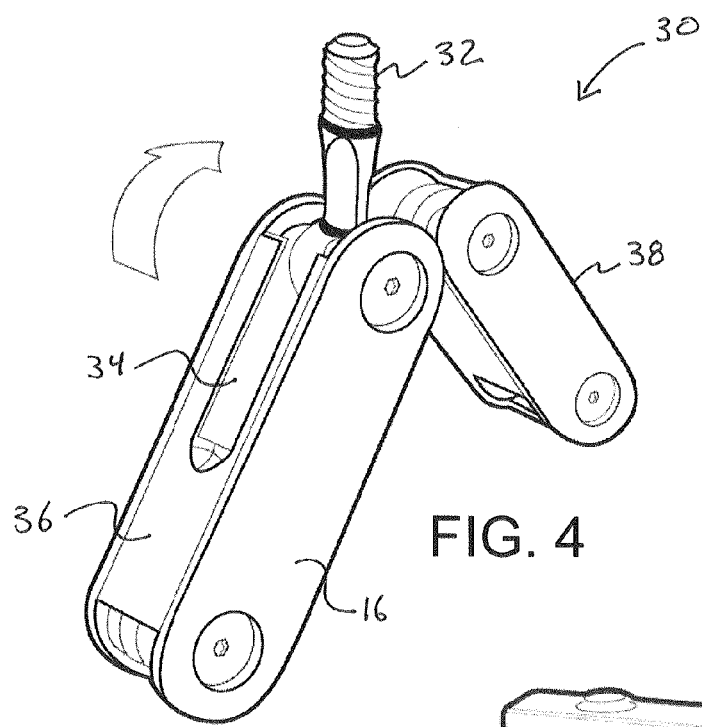
FIG. 4 is a perspective overall view of a multi-tool with mount.
Figure 5:
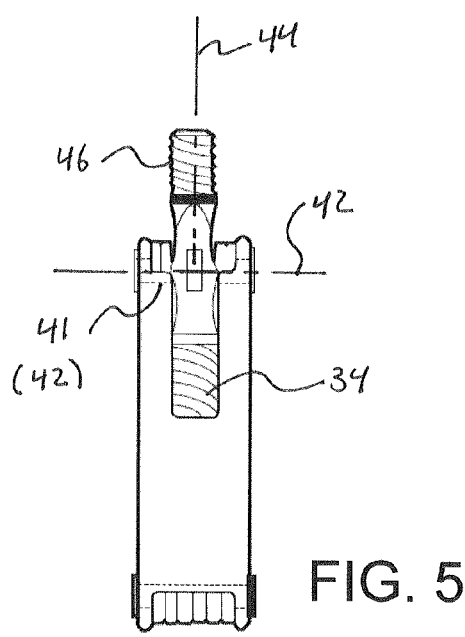
FIG. 5 is an elevational cross-sectional view of the same.
Figure 6:
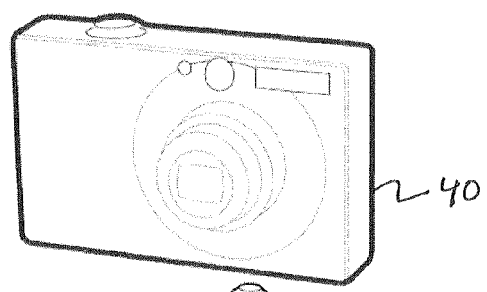
FIG. 6 is a perspective overall view of the multi-tool with mount and device.
Figure 6:
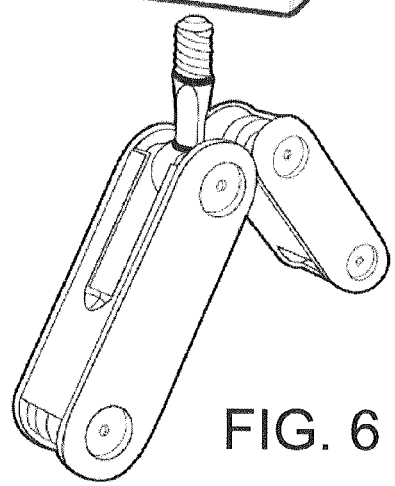

Reference will now be made to FIGS. 4 through 6 and discussion of the multi-tool with mount 30. This particular embodiment provides a mount 32 which defines a mount pocket 34 for receiving the mount 32 into the casing 36 of the first handle 16. A second handle 38 is provided with the multi-tool as is normally the case where two handles are required for the multi-tool to provide the gripping of say, for example, the pliers.

The mount itself is provided for enabling the multi-tool stand with mount 30 to receive a device 40 which may be a digital camera, handheld PDA or cell phone, digital video camera, iPhone, or other optical device which requires to be placed on a stationary surface and mounted for optical use.

The mount 32 is aligned along a radially extending mount axis 44 which is perpendicular to the pivot axis 42a of a pivot axle 42 to which the mount 32 is rotatably attached. The mount 32 has a securing means 46 which may be a threaded male stud portion on the mount for connection to the female portion of the device 40. The securing means 46 may also be a snap, magnetic connector, or other typical connection means for providing stand connections to the optical device.

Referring to FIGS. 7 through 9, a discussion of a combination multi-tool stand with mount 50 will now be provided. Here the mount 32 is rotatably attached to the second handle 38 and the pivot stands 52 which include a first pivot stand 52A and a second pivot stand 52B which are pivotably attached to the outer handle face 17 of the first handle 16. Each of the pivot stands 50 has a length 56 which in this embodiment is approximately two thirds of the longitudinal length of the outer handle face 17. Furthermore, a pivot stand recess 53 is provided for receiving the pivot stands 52A& B in a stowed position. The pivot stands 52A & B are each connected to the outer handle face 17 through the use of a pivot hinge 54 which is provided at a pivot hinge angle 58. This pivot hinge is aligned along a pivot plane 60. The pivot stands 52 bias outwards at a non-planar angle along the pivot plane 60 to provide tow of the three legged stance 55 for a stable stand to resist overturning of the digital device 40 or optical device. As can be seen in FIG. 9, the optical device 40 is combined with the multi-tool stand with mount 50 to provide an impromptu stand for, in this particular embodiment, capturing pictures on a stable surface.

Referring to FIGS. 10 and 11, a detailed discussion of the multi-tool with radially aligned swing leg and mount 62 will be provided. Here the multi-tool with swing leg and mount has a three-legged stand where the swing out leg 64 radially pivots from the swing out leg recess 68 maintained within the side wall of the first handle 16. The second handle 38 holds the mount 32 which enables the device 40 to be seated on the mounts 32 and positioned accordingly. In this particular embodiment, the multi-tool 62 as a first surface engaging location 72 which is at the non-pivot end of the multi-tool, a second surface engaging location 74 which is the non-hinged end of the swing out leg 64, and a third surface engaging location 76 which in this particular embodiment is at the hinged end of the multi-tool of the first handle 16.

The multi-tool 62 can be placed in a closed position 70 where the first and second handles are closed upon one another and the swing out leg 64 is closed into the recess 68. The swing out leg 64 is rotatable out of the recess 68 through connection with a sidewall hinge 66.

Referring now to FIGS. 12 through 14, a multi-tool with spring-loaded radially aligned V-shaped legs 82 with mount 32 will now be discussed. In this particular embodiment, the first support leg 86A and the second support leg 86B are each rotatably attached to a spring-loaded hinge 84A and 84B. (In an alternative embodiment the hinge is not spring loaded.) The first and second support legs 86A and 86B can be pressed together and rotated about the hinge axis or hinge axle 88 to be held within the body of the first handle 16. The mount 32 is positioned on the outer wall 90 of the second handle 38 where the mount 32 is rotatable about the second handle hinge axle 92 from an open position or from an engageable position to a non-engageable position. When stowed, the mount 32 is placed into a mount recess 94 which is located in the outer wall 90.

With the first and second legs 86A and 86B extended and the first handle 16 positioned on the surface, the first surface engaging location 72 a second surface engaging location 74 and the third surface engaging location 76 provide a three-legged stand for maintaining the device 40 on the mount 32 and positioned in its proper direction.

Figure 15:
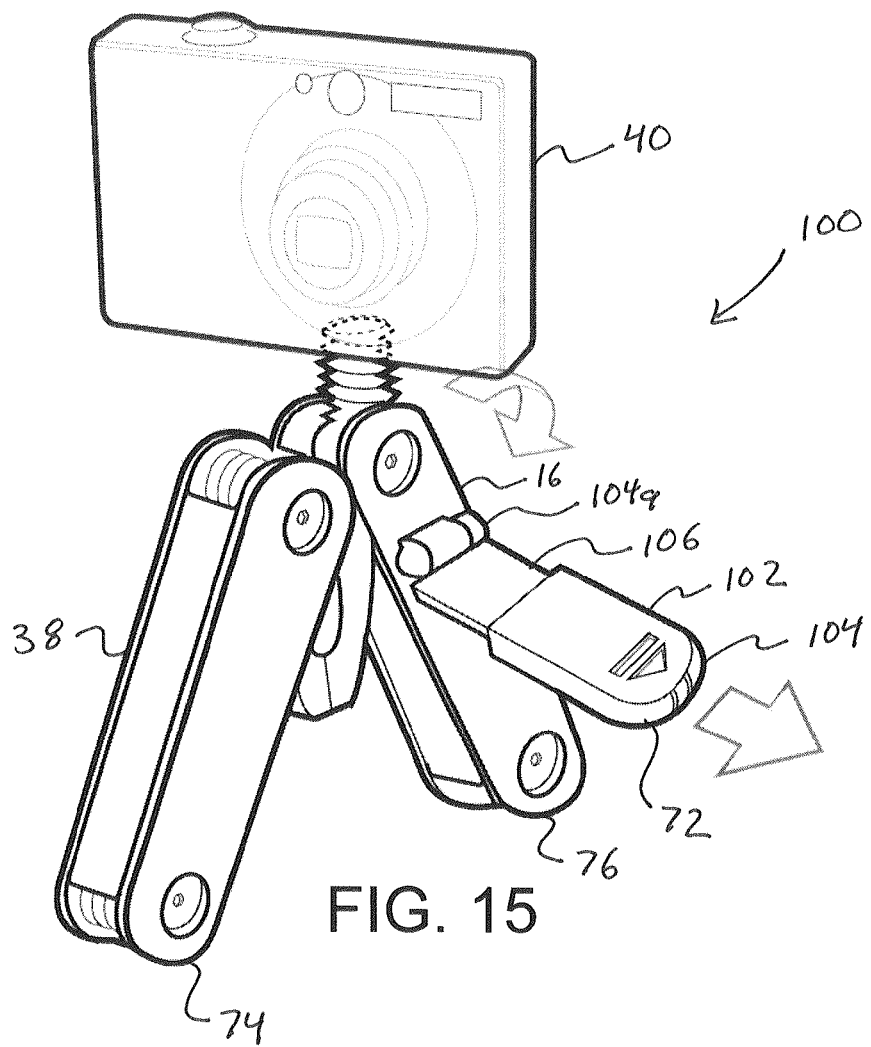
FIG. 15 is a perspective overall view of a multi-tool with mount and telescoping leg.
Figure 16:
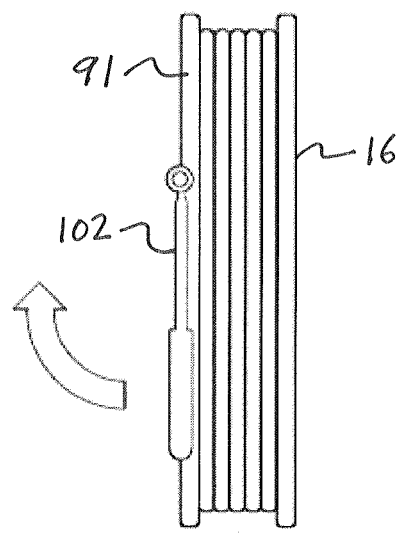
FIG. 16 is an elevational view of the same.
Figure 27:
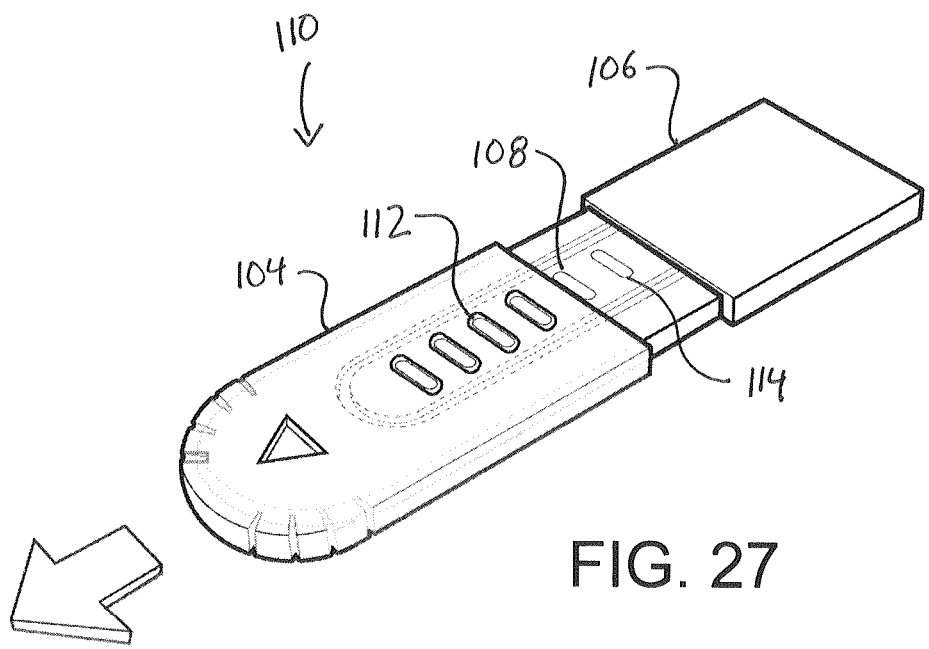
FIG. 27 is a detailed perspective view of a first locking mechanism.
Figure 28:
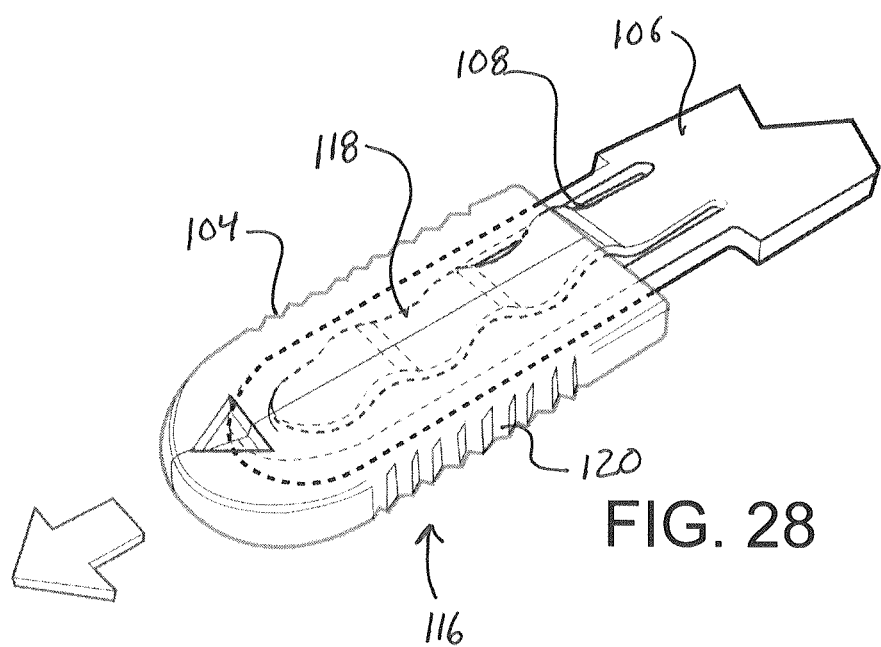
FIG. 28 is a detailed perspective view of a second locking mechanism.

Referring now to FIGS. 15 and 16, a discussion of the multi-tool with mount and first telescoping leg 101 will now be provided. In this particular embodiment, the three-legged stand is provided by the first leg 16 and second leg 38 along with a first telescoping leg 102. The first telescoping leg 102 is rotatably attached to the side wall or outer wall 91 of the first leg 16 through the use of a hinge 104. When not in use, the telescoping leg 102 is placed in parallel alignment with the outer wall 91 of the first handle 16. The telescoping leg 102 is arranged with a outer sleeve 104 slidably engaging an inner leg 106 which is rotatably attached to the hinge 104. Referring briefly to FIGS. 27 and 28, the outer sleeve 104 can be extended and maintain its position through various locking mechanisms. A first locking mechanism 110 provides for a locking leg element 108 which has a plurality of female recesses 114 which are arranged to receive a plurality of male protrusions 112 from the outer sleeve 104. By the user pressing or extending the outer sleeve 104 along the longitudinal length of the telescoping leg 102, the user exerts a force to overcome the recess friction and extend or retract the leg as desired.

Similarly, a second locking mechanism 116 includes the outer sleeve 104 extended over an integral spring element 108 which provides for continuous friction. The interval spring element 108 in this embodiment is a sinusoidal flat bar which provides for increased amplitude or depth within the outer sleeve's recess for creating friction between the top wall 118 and bottom wall 120 of the outer sleeve 104.

Referring back to FIGS. 15 and 16, the outer sleeve 104 can be extended to create the first surface engaging location 72 with the distal ends of the first handle and second handle creating the second surface engaging location 74 and third surface engaging location 76 for three point stable support of the device 40.

Figure 17:
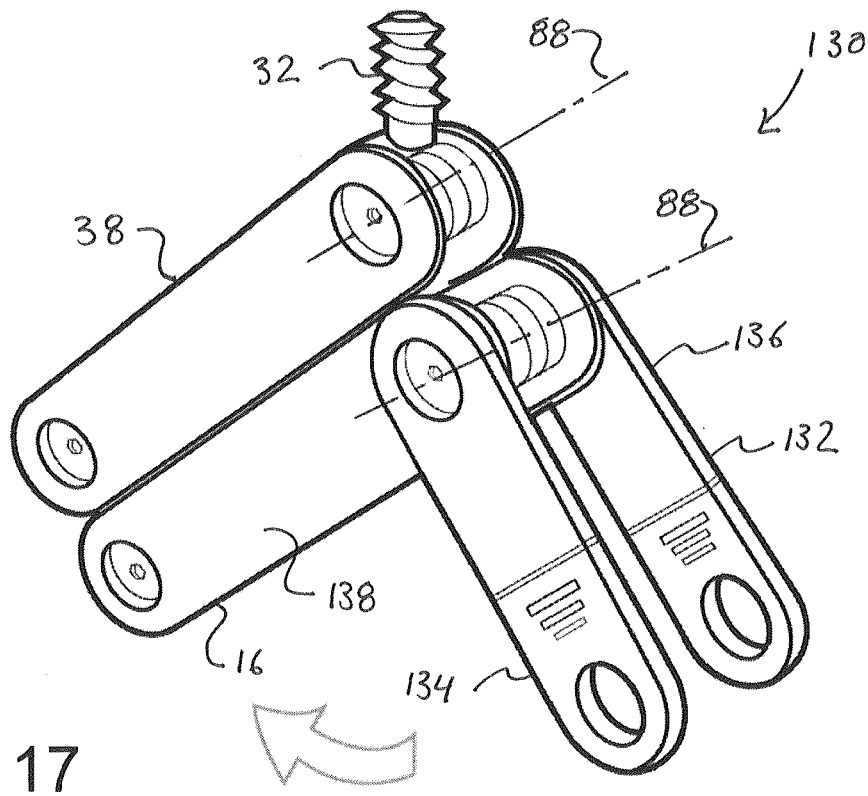
FIG. 17 is a perspective overall view of a multi-tool with mount and dual telescoping side legs.
Figure 18:
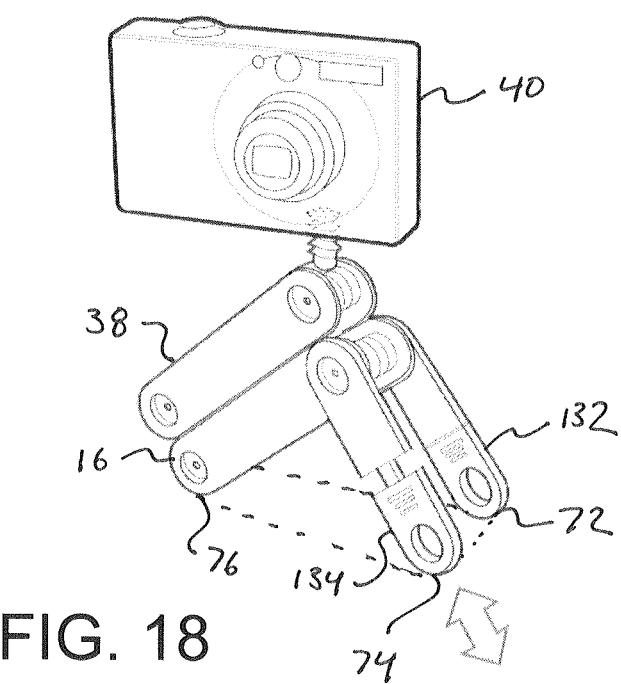
FIG. 18 is a perspective overall view of the same with device.

Referring now to FIGS. 17 and 18, a multi-tool with mounts and dual telescoping side legs 130 is provided. The first telescoping side leg 132 and the second telescoping side leg 134 are each attached to the hinge angle 88 and positioned on the first outer wall 136 and second outer wall 138 respectively of the first handle 16. The mount 32 is rotatably attached to the hinge axle 88 of the second handle 38. When attached to the mount 32 the device 40 needs to be positioned within the three-point stability support limits which are defined by the first surface engaging location 72 which in this particular embodiment is the distal end of the first telescoping leg 132, the second surface engaging location 74 which is the distal end of the second telescoping leg 134 and the third surface engaging location 76 which is the distal end of the first handle 16.

Figure 19:
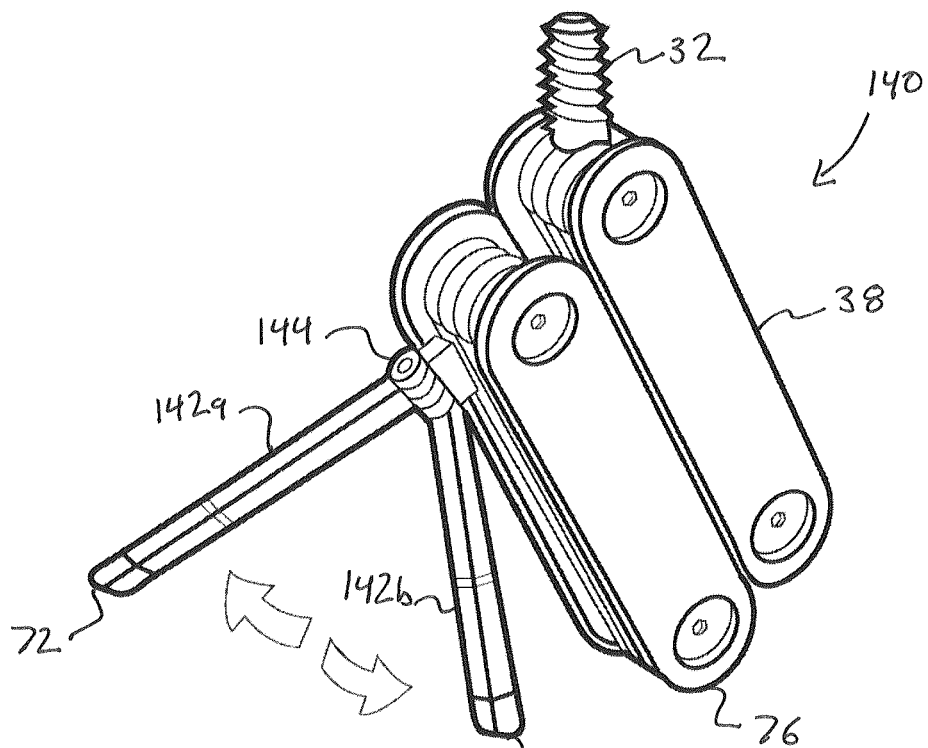
FIG. 19 is a perspective overall view of a multi-tool with mount and split spring-loaded hinge legs.
Figure 20:
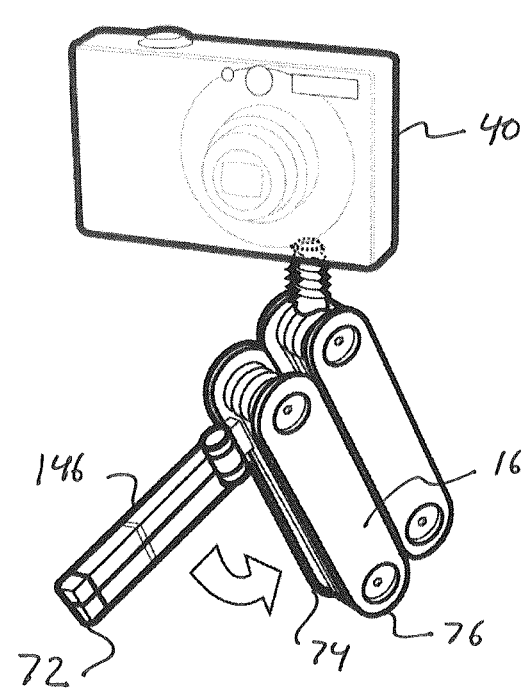
FIG. 20 is a perspective overall view of the same with device.

Referring to FIGS. 19 and 20, a multi-tool with mounts and spring-loaded hinge legs 140 will now be discussed. Again the mount 32 is rotatably attached to the second handle 38 and the first and second surface engaging locations are defined by the distal ends of a pair of split spring-loaded hinge legs 142A and 142B which are each rotatably attached to a single longitudinally aligned hinge 144. In an alternative embodiment, the pair of split hinge legs 142A and 142B are not spring-loaded with the longitudinally aligned hinge 144. With the legs closed and in a radially alligned parallel alignment with one another as can be seen in FIG. 20, the closed legs 146 can be rotatably placed inside of the first handle 16 for stowing of the multi-tool.

Figure 21:
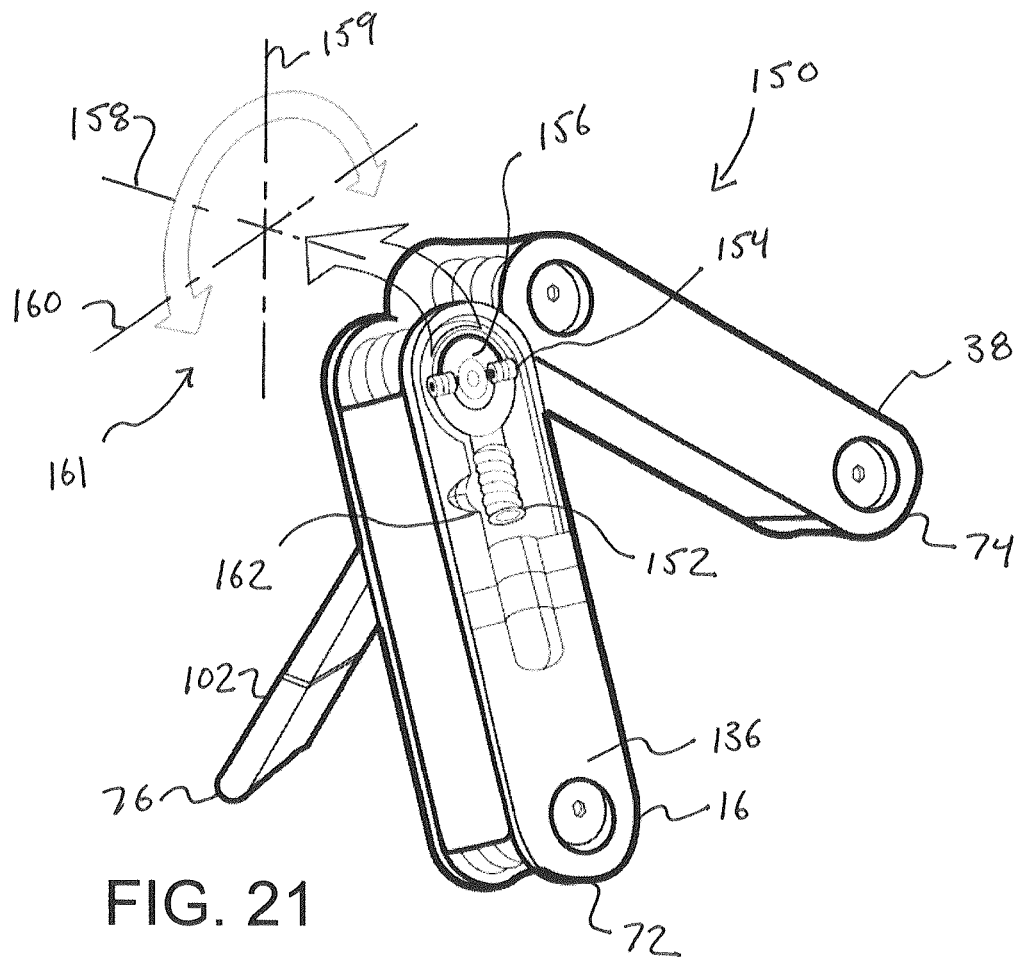
FIG. 21 is a perspective overall view of a multi-tool with multi-angular mount and telescoping leg.
Figure 22:
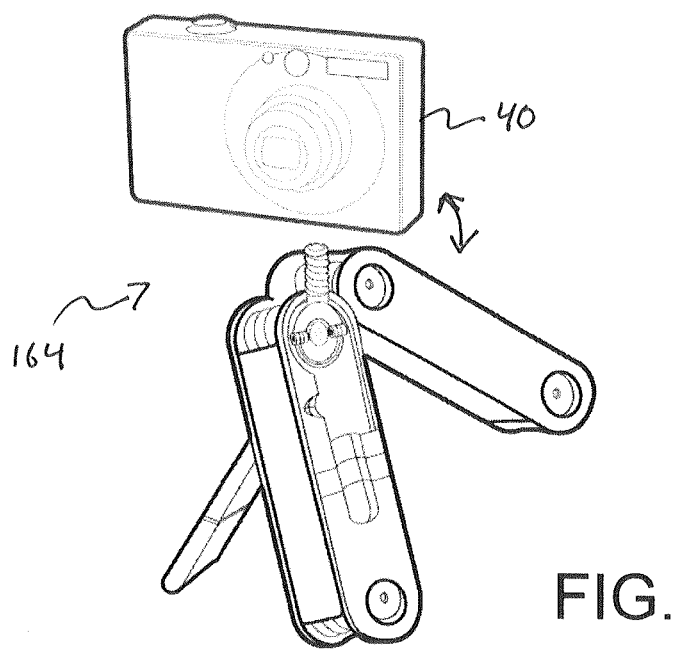
FIG. 22 is a perspective overall view of the same with device.

Referring to FIGS. 21 and 22, a multi-tool with a multi-angular mount and telescoping leg 150 is provided. Here the first handle 16 and second handle 38 act as the first and second surface engaging locations 72 and 74 respectively and the telescoping leg 102 acts as the third surface engaging location 76. The device 40 can be supported by the multi-angular mounts 152 where the multi-angular mount 152 is built-in to the first outer wall 136 of the first handle 16. The multi-angular mount 152 has 2° of positional freedom. This is provided by the radial hinge 154 which is attached to the multi-angular mount 152 and provides secure attachment to a longitudinal plane hinge 156. The longitudinal plane hinge 156 has 360° of rotational freedom in the longitudinal plane 160 while the radial hinge 154 has at least 180° of rotation freedom in the radial plane 158. The multi-angular mount 152 can be seated within a mounting recess 162 or removed from the recess and positioned into a device support position 164. With a certain amount of rotational resistance within the radial hinge 154 and the longitudinal plane hinge 156, the multi-angular mount 152 can support the load from the device 40 and also provide for proper planer adjustments of the device 40 for the desired photo etc.

Figure 23:
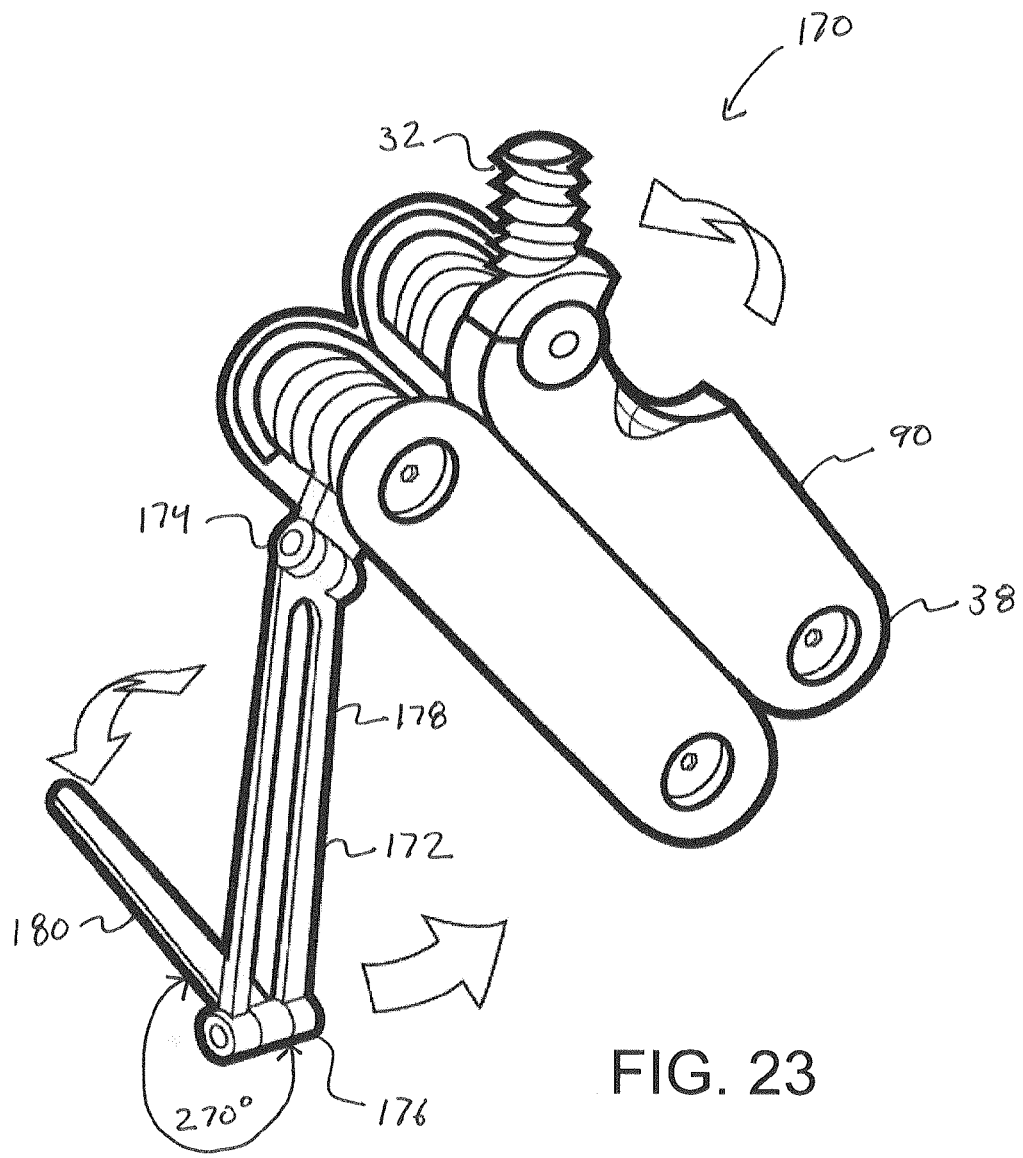
FIG. 23 is a perspective overall view of a multi-tool with mount and two hinge leg.

Referring now to FIG. 23, a multi-tool with mount and two hinged legs 170 will now be discussed. Here the mount 32 is positioned as previously discussed in FIG. 12 through 14 on the outer wall 90 of the second handle 38. The two hinge support leg 172 has a first hinge 174 which provides for certain amount of angular positioning of the support leg, and a second hinge 176 which connects a first leg member 178 to the second distal end leg member 180. The second distal leg member 180 can pivot approximately 270° from the closed position to an open support position where the second hinge 176 will not allow the first leg member 178 and second leg member 180 to close down upon one another.

Figure 24:
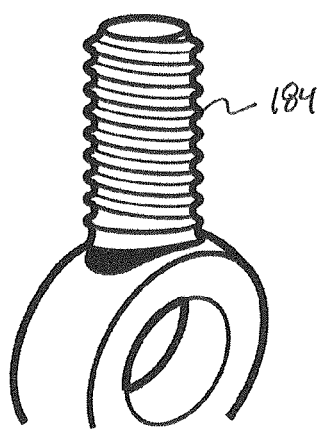
FIG. 24 is a detailed perspective view of a full round mount.
Figure 25:
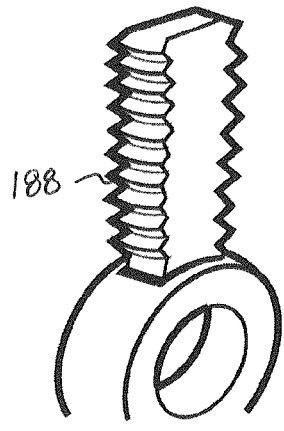
FIG. 25 is a detailed perspective view of a slice mount.
Figure 26:
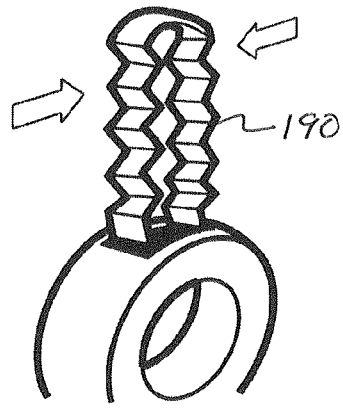
FIG. 26 is a detailed perspective you of the spring mount.

Referring to FIGS. 24 through 26, a brief discussion of various embodiments of the mounts will now be provided. FIG. 24 shows a full round threaded mount 184 which provides for a wider diameter, but more readily fits the female portion of the device 40 when securing the device in a mounting position.

FIG. 25 discloses a slice mount 186 where the threads 188 are provided in proper spiral alignment but the outer diameter portions of the mounts have been removed for storage space in the multi-tool. Lastly, a spring mount 190 is provided for fitting various devices which may have varying diameters of female mounting locations. Here the spring mounts can be diametrically narrowed to fit a range of diameters.

Figure 29:
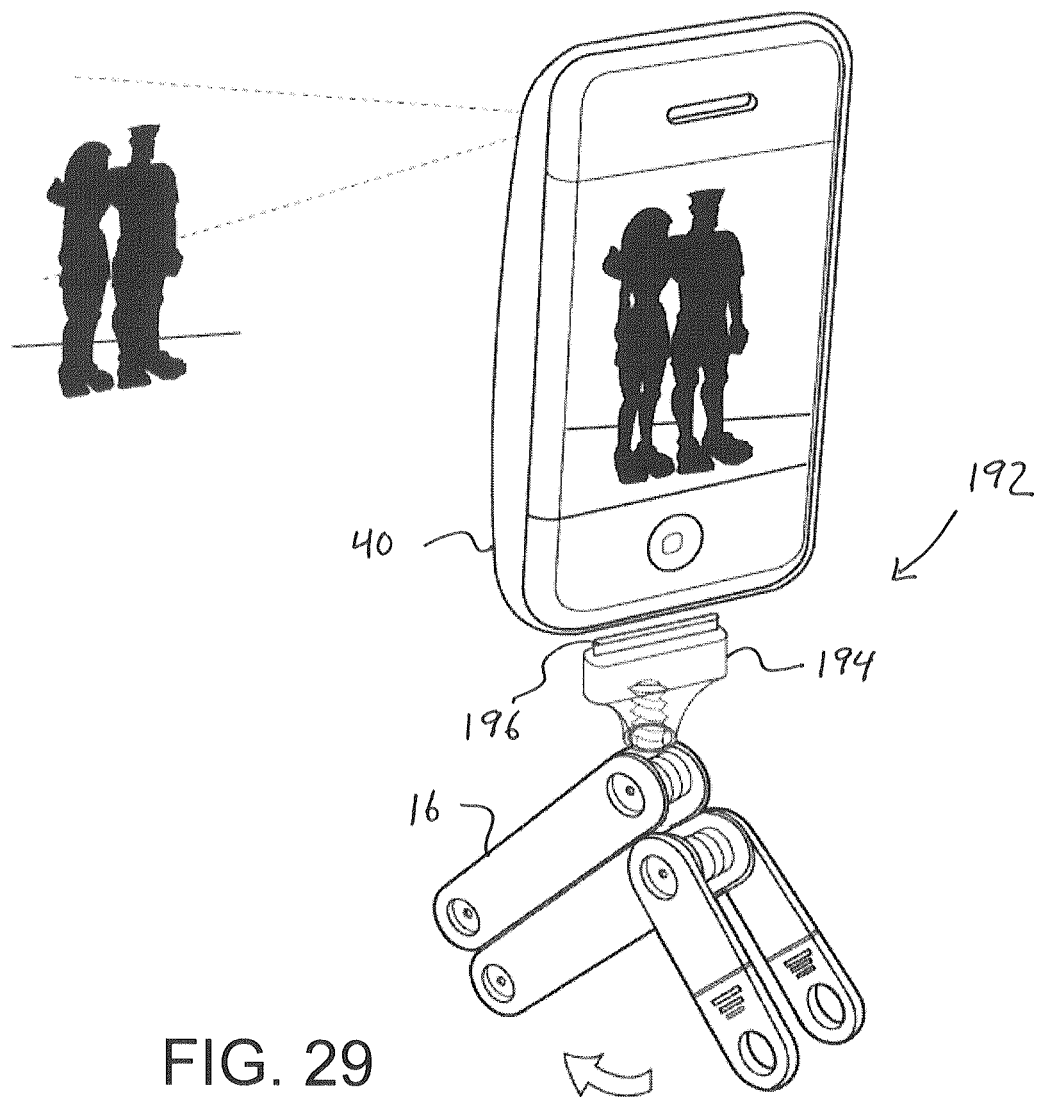
FIG. 29 is a perspective overall view of a multi-tool with dual telescoping legs and component plug.

Referring to FIG. 29, a multi-tool with dual telescoping legs and a component plug 192 is provided. Here the first handle 16 has a radially aligned component plug 194 which can be fitted to a device 40 for example and iPhone. They component plug 194 has the same shape of the data plug 196 in the device 40. For example, the component plug 194 may be shaped as a USB connector with the ability to seat into the data plug of the cell phone. A variety of component plugs 194 can easily be provided. For example, the component plug may have the shape of a type A USB, type B USB, a Mini-A USB, a Mini-B USB, a Micro-AB USB, or a Micro B USB. In addition, the plug may be configured to fit various proprietary connectors and formats for example a Microsoft Xbox format, and Apple iPhone or iPod format, a Nokia format, or any other device which is currently on the market.

Figure 30:
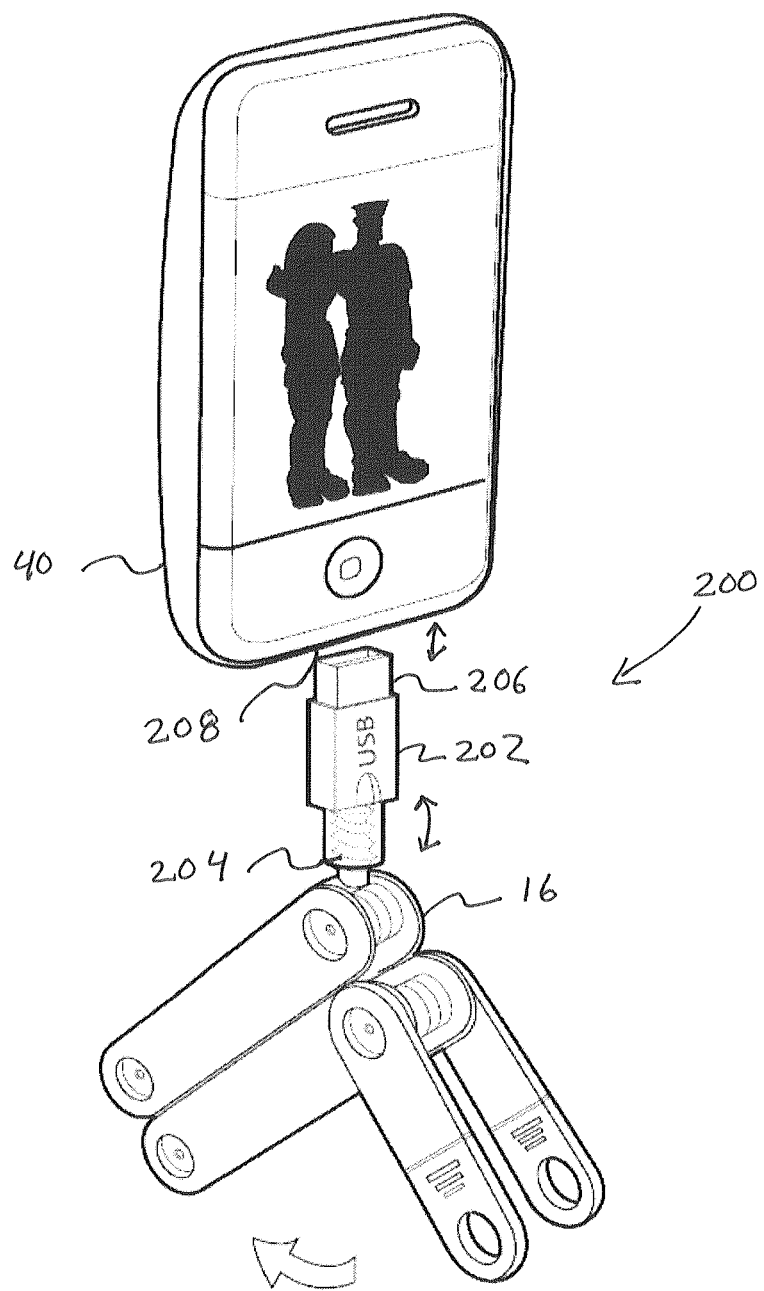
FIG. 30 is a perspective overall view of a multi-tool with dual telescoping legs and USB mount.

Referring to FIG. 30, a multi-tool with dual telescoping legs and a USB flash drive 200 is provided. Here a USB flash drive 202 is radially attached to the first leg or first handle 16 of the multi-tool. The flash memory 202 is seated on a 360° hinge 204 where the USB can be rotated out of longitudinal alignment with the first handle 16 for positioning of the USB male connector 206 to the USB receptor 208 of the device 40.

Figure 31:
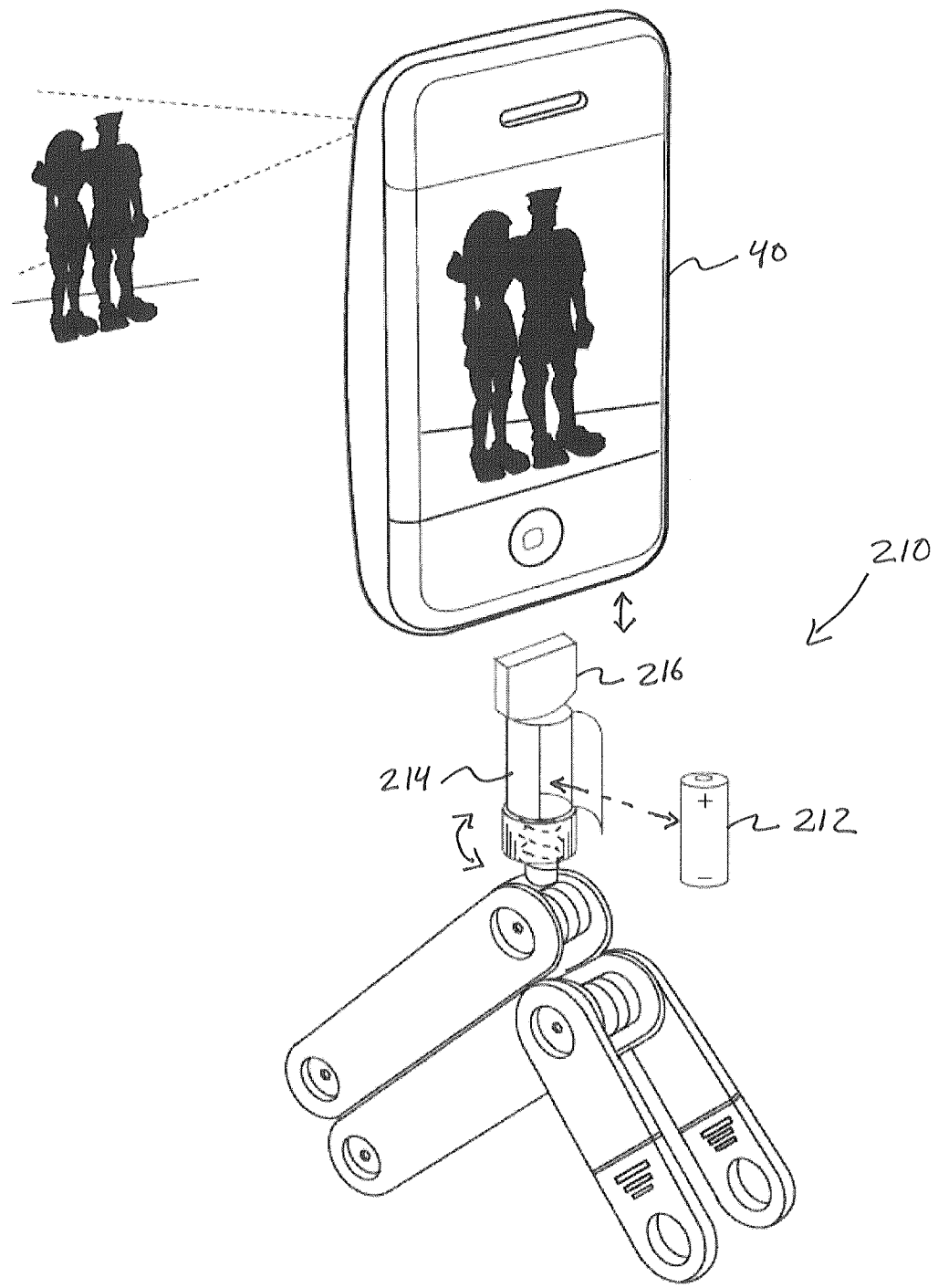
FIG. 31 is a perspective overall view of a multi-tool with dual telescoping legs and a power source mount.

Lastly referring to FIG. 31, a multi-tool with dual telescoping legs and electronic USB power source 210 is provided. Here a power source 212 such as a lithium ion battery can be placed into the power source casing 214 to provide charge to the electronic device 40 through the USB connection 216.

Therefore, generally speaking the multi tool has a handle arranged along a longitudinally aligned axis, the handle has a first end and a second end, the handle also has a housing and a first tool contained within the housing. The multi tool also has a prop configured in conjunction with the first handle to provide stability against overturning of the multi tool when supporting a device. The multi tool also has a mount which is inter-operationally attached to either the handle or the prop and is configured to connect to the device and maintain the device in an upright position.

Another object of the multi tool is to include at the first end of the handle a hinge; where the prop is pivotably connected to the a hinge, the prop being configured to rotate away from the handle about the hinge to a support position to provide stability to the multi tool when the mount is connected to the device.

In one embodiment the prop is acts as a second handle of the multi tool.

In a further embodiment the prop can have a first leg pivotably attached to the handle at the hinge, where the hinge is arranged along a vertically aligned axis substantially perpendicular to the longitudinally aligned axis, the first leg being rotatable about the hinge a radial distance to a support position, where the prop and the handle provide stability against overturning of the device when connected to the mount.

In an alternative embodiment the prop may have a first leg and a second leg each rotatably attached to the handle near the first end and the first and second legs would be configured to bias away from the handle to form two legs of a three-legged stand, the three-legged stand made of the first leg, the second leg, and the handle.

The first tool itself can be considered in one embodiment the mount which can be pivotably attached to the handle to extend from a mount pocket location in the housing to a device engaging location.

In a further alternative embodiment the first leg and said second leg may each be connected to the housing at an outer surface location of the housing and form an outer shell of the handle.

Also, the first leg and said second leg each can have a radial length about at least two thirds of the handle longitudinal length, and each of the first and second legs can be configured to extend from a housing recess in the handle sidewalls to form two legs of a three-legged stand which three legged stand includes the first leg, the second leg, and the handle.

In a further alternative embodiment the first and second leg can each pivot about a pivot hinge located substantially at the first end of the handle. The pivot hinge may be arranged at a pivot hinge angle in a non-parallel alignment to the longitudinal axis which provides an angular pivot plane about which the first and second legs pivot away from the handle to form two legs of a three legged stand.

The prop may also be a detachable leg from the multi tool which is insertable into a slot located on the handle and enabling the multi tool to provide overturning stability when supporting a device on the mount.

The multi tool may have a further alternative embodiment of the mount that being a detachable mount insertable into a slot located on the handle enabling the multi tool to provide a mounting position to the device.

The multi tool may also have a second handle which is interoperable with a first handle to form a multi tool plier, the second handle further has a second handle hinge about which the mount is rotatably connected.

In a further alternative embodiment the multi tool may have a first leg and a second leg interoperable with the first handle of a two handle multi tool.

The multi tool may have the first leg and said second leg rotatably attached to the handle about a hinge, with the first and second leg stowable into an interior receiving portion of the housing of the handle.

The multi tool may also have the first and second legs configured with spring-loaded hinges arranged near the handle hinge to provide outward biasing of the first and second legs to form two legs of the three-legged stand.

The multi tool may also have a third leg rotatably attached to either the first handle or the second handle at an outer wall location where the first handle, second handle, and third leg form the three legged stand.

The multi tool may also have the prop configured as a telescoping leg along its radial length. In addition the multi tool may have the mount configured as a multi-angular mount to rotate about the longitudinally aligned axis, the transverse axis, and the vertical axis.

The multi tool may also have a prop configured as a first leg with a first leg hinge interoperably attached to a hinge of the handle, a first leg member disposed between said first leg hinge and a second leg hinge, and a distal leg member rotatably connected to the second hinge, where the distal leg member provides stability against overturning while supporting the device.

The multi tool may also have the mount configured as a threaded mount for connecting to a standard threaded female camera mount receptacle, a spring mount, a component plug for connection to a digital device, a USB device, or a USB dummy plug.

The multi tool may also have the mount configured as an electronic USB power source able to receive a portable power supply into a power source casing and provide electrical power through a USB connection to the device (such as a camera, iphone, ipad, pda, ipod, etc. . . . ) where the device is generally a digital device.

The multi tool may also have the first tool configured as a knife blade, pliers, wire cutters, wire strippers, bit drivers, screwdrivers, saw blades, bottle openers, can openers, files, razors, gut hooks, scissors.

The multi tool may have the prop configured as a knife blade to be staked into a support location (such as the ground or a tree) to provide stability against overturning of the multi tool when supporting the device.

A multi tool can be a combination of the above including the first handle arranged along the first longitudinally aligned axis, the first handle having a first handle hinge end and a first handle distal end; a second handle arranged along a second longitudinally aligned axis, the second handle connected to the first handle hinge and the second handle also has a second handle distal end; the first handle and second handle each may have respectively a first handle housing and a second handle housing; a first tool which may be a knife blade contained within either the first handle housing or the second handle housing; a mount interoperably attached to either the first handle, the second handle, or the prop to maintain the device in an upright position; a prop having a stability component interoperably attached to either the first handle or the second handle to provide stability against overturning of the multi tool combination when supporting a device.

A multi tool may also be utilized in a propping method which includes: arranging the handle arranged along a longitudinally aligned axis onto a first surface engaging location, the handle has a first end and a second end, a housing, and a first tool contained within the housing; arranging a prop interoperably attached to the first handle onto a second surface engaging location where the prop and the first handle provide stability against overturning of the multi tool when supporting a device; arranging a mount interoperably attached to either the prop or the handle into an upright position and connecting the device to the mount to maintain the device in the upright position.

There may also be a multi tool combination which includes: a first handle arranged along a first longitudinally aligned axis, the first handle having a first handle hinge end and a first handle distal end; a second handle arranged along a second longitudinally aligned axis, the second handle connected to the first handle hinge end and the second handle also having a second handle distal end; the first handle and the second handle each having respectively a first handle housing, a second handle housing; a first tool which has a pair of plier jaws pivotably connected to the first handle and the second handle respectively about the first handle hinge, the pair of plier jaws contained within the first handle housing and the second handle housing when closed; a prop which has a first leg and a second leg each rotatably attached to the first handle hinge and configured to bias away from the first handle to form two legs of a three legged stand, the three legged stand having the first leg, the second leg, and the first handle; the three legged stand providing stability against overturning of the multi tool combination when supporting a device; a mount, interoperably attached to either the first handle, the second handle, or the prop to maintain the device in an upright position.

We claim:

1. A multi-tool comprising:
a first handle having first and second legs pivotally attached thereto, such that the first and second legs have a stowed position and a deployed position;
a second handle pivotally attached to the first handle, wherein the second handle has a mount pivotally attached thereto, such that the mount has a stowed position and a deployed position,
wherein the first handle has a first handle housing and the second handle has a second handle housing, at least a first tool included within the first handle housing or the second handle housing;
wherein the mount attaches to a device and wherein the first and second legs are used to provide stability when in their deployed position, so that the device is maintained in an upright configuration when the first and second legs are in their deployed position and the mount is in its deployed position,
wherein the first and second legs rotate in a first direction when moved from their stowed position to their deployed position and wherein the mount rotates in a direction opposite to the first direction when moved from its stowed position to its deployed position.

2. The multi-tool of claim 1, wherein the first handle housing has a first recess and a second recess, wherein the first leg is pivotally attached to the first handle housing and is received within the first recess when in its stowed position, and wherein the second leg is pivotally attached to the first handle housing and is received within the second recess when in its stowed position.

3. The multi-tool of claim 1, wherein the first and second handles are pivoted between a closed position and an open position, and wherein the first and second handles are in their closed position when the first and second legs are in their deployed position and when the mount is in its deployed position.

4. The multi-tool of claim 1, wherein the mount pivots about a mount pivot axis, wherein the first leg pivots about a first leg pivot axis, and wherein the mount pivot axis and the first leg pivot axis are not parallel to one another.

5. The multi-tool of claim 4, wherein the second leg pivots about a second leg pivot axis and wherein the second leg pivot axis is not parallel to both the mount pivot axis and the first leg pivot axis.

6. The multi-tool of claim 1, wherein the first handle, the first leg and the second leg all contact a surface when the first and second legs are in their deployed position and wherein the second handle does not touch the surface.

7. The multi-tool of claim 6, wherein the mount has a central axis and wherein no plane both passing perpendicularly through the central axis of the mount and parallel to the surface intersects any portion of the first or second leg.

8. The multi-tool of claim 6, wherein the mount has a central axis, wherein the mount has a portion with threads, and wherein no plane passing perpendicularly through the central axis of the portion of the mount with threads and parallel to the surface intersects any portion of the first or second leg.

9. The multi-tool of claim 1, wherein a tool selected from the group consisting of: pliers, a wire cutter, a wire stripper, a knife blade, a bit driver, a screwdriver, a saw blade, a bottle opener, a can opener, a saw, a file, a razor, a gut hook and scissors, is stored within the first handle housing or the second handle housing.

10. The multi-tool of claim 1, wherein the first and second legs are stored within the first handle housing when in their stowed position, and wherein the mount is stored within the second handle housing when in its stowed position.

11. The multi-tool of claim 1, wherein the second handle has a mount pocket for receiving the mount when the mount is in its stowed configuration.

12. A multi-tool comprising:
a first handle having first and second legs pivotally attached thereto, such that the first and second legs have a stowed position and a deployed position;

a second handle pivotally attached to the first handle, wherein the second handle has a mount pivotally attached thereto, such that the mount has a stowed position and a deployed position, wherein the first handle has a first handle housing and the second handle has a second handle housing, at least a first tool included within the first handle housing or the second handle housing, wherein the mount attaches to a device and wherein the first and second legs are used to provide stability when in their deployed position, so that the device is maintained in an upright configuration when the first and second legs are in their deployed position and the mount is in its deployed position, wherein the first handle, the first leg and the second leg all contact a surface when the first and second legs are in their deployed position and wherein the second handle does not touch the surface.

13. The multi-tool of claim 12, wherein the mount has a central axis and wherein no plane both passing perpendicularly through the central axis of the mount and parallel to the surface intersects any portion of the first or second leg.

14. The multi-tool of claim 12, wherein the mount has a central axis, wherein the mount has a portion with threads, and wherein no plane passing perpendicularly through the central axis of the portion of the mount with threads and parallel to the surface intersects any portion of the first or second leg.

15. A multi-tool comprising:

a first handle having first and second legs pivotally attached thereto, such that the first and second legs have a stowed position and a deployed position;

a second handle pivotally attached to the first handle, wherein the second handle has a mount pivotally attached thereto, such that the mount has a stowed position and a deployed position, wherein the first handle has a first handle housing and the second handle has a second handle housing, at least a first tool included within the first handle housing or the second handle housing, wherein the mount attaches to a device and wherein the first and second legs are used to provide stability when in their deployed position, so that the device is maintained in an upright configuration when the first and second legs are in their deployed position and the mount is in its deployed position, wherein the mount pivots about a mount pivot axis, wherein the first leg pivots about a first leg pivot axis, and wherein the mount pivot axis and the first leg pivot axis are not parallel to one another.

16. The multi-tool of claim 15, wherein the second leg pivots about a second leg pivot axis and wherein the second leg pivot axis is not parallel to both the mount pivot axis and the first leg pivot axis.

* * * * *